April 7, 1964     E. N. BURNETT     3,127,991
COMBINED SHIPPING CONTAINER AND ORGANIZER FOR
FROZEN FOOD PACKAGES Filed Nov. 23, 1960     3 Sheets-Sheet 1

INVENTOR.
Edward N. Burnett
BY
*Townsend and Townsend*
*attorneys*

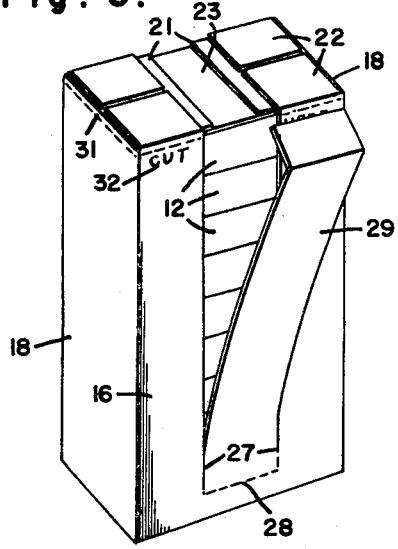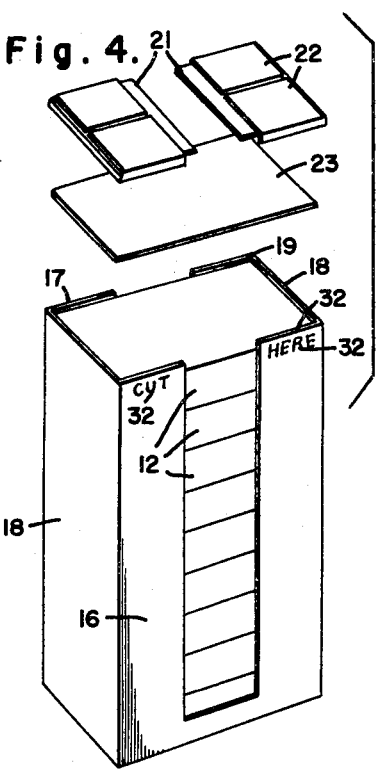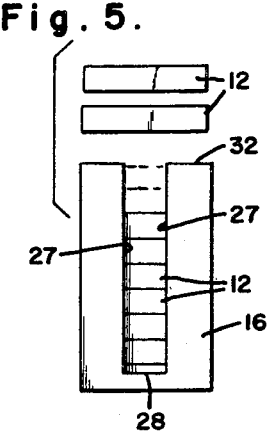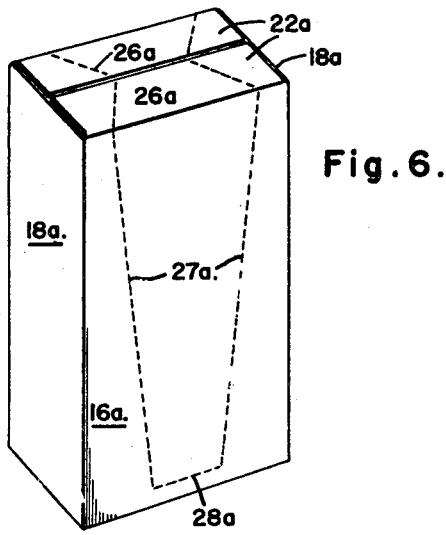

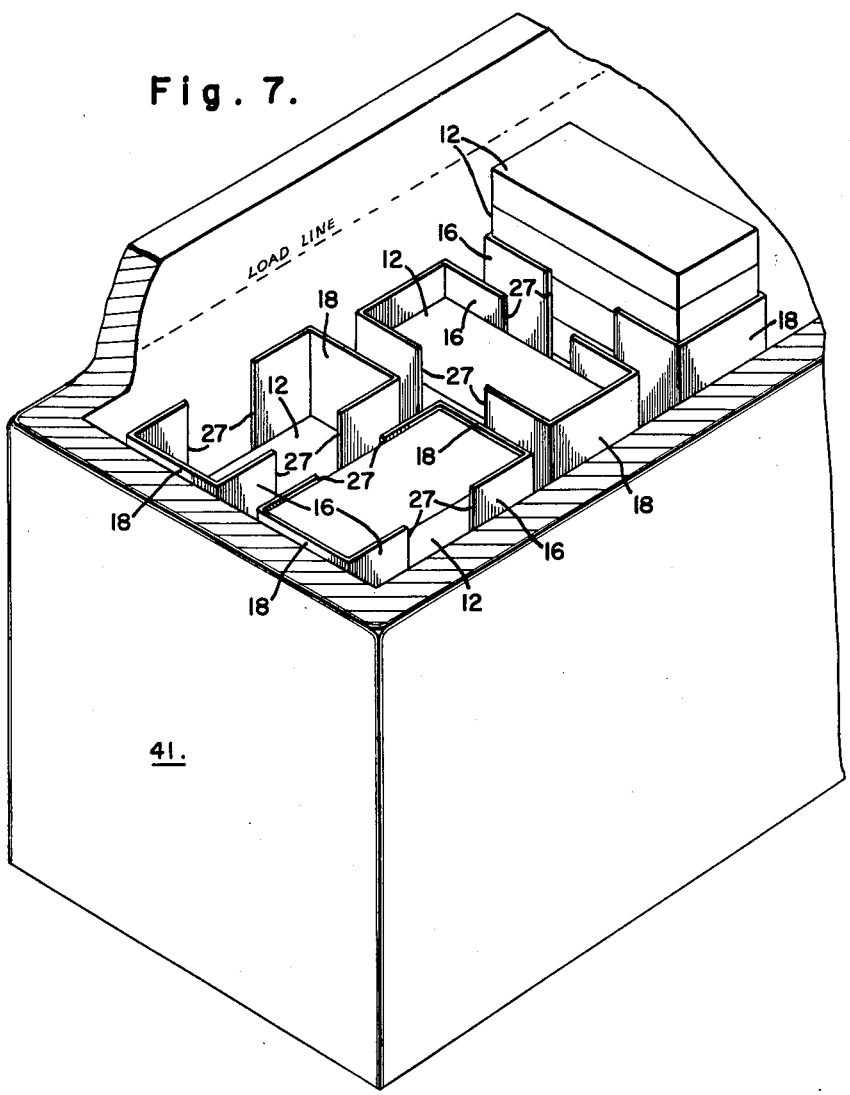

United States Patent Office 3,127,991
Patented Apr. 7, 1964

3,127,991
COMBINED SHIPPING CONTAINER AND ORGANIZER FOR FROZEN FOOD PACKAGES
Edward N. Burnett, Fremont, Mich., assignor to Gerber Products Company, Fremont, Mich.
Filed Nov. 23, 1960, Ser. No. 71,224
3 Claims. (Cl. 206—56)

The present invention provides a shipping container for frozen food packages which is so constructed that portions thereof may be removed at the point of sale to expose the inside cartons, the container thereafter functioning as an organizer. By an organizer is meant a device to hold the cartons in orderly arrangement when they are displayed in a refrigerator case or the like of a retail store.

The present invention provides a sleeve-like shipping container for a plurality of cartons, such as rectangular frozen food packages and/or the like. As hereinafter described in detail, portions of the container are slotted or otherwise weakened so that the retailer may tear away parts to expose the cartons. This enables a purchaser to view the merchandise and also enables the retailer to mark the price of the various items on the cartons. The organizer thus constructed may be placed in an open top frozen food refrigerator and the purchasers may remove the packages one at a time from the organizer.

A principal advantage of the present invention is that it facilitates rotation of merchandise, which is one of the problems encountered by retailers in dispensing frozen foods. Thus, the organizer may be removed from the refrigerator when most of the packages have been dispensed, a new organizer full of containers placed in the refrigerator and the packages remaining in the previously used organizer placed on top of the new one. Thus the contents are automatically rotated.

Another advantage of the present invention is the fact that it prevents the bottommost container from freezing to the bottom of the refrigerator, inasmuch as the bottom of the organizer is interposed.

Still another advantage of the invention is the fact that the original cost of an organizer is reduced and the replacement and maintenance of conventional organizers such as wire racks or cardboard dividers is eliminated.

A still further feature of the invention is the fact that two or more cartons may be glued or otherwise secured together during transportation and separated at the point of sale, one-half of the group being opened and exposed for sale while the other half is stored.

Other objects of the present invention will become apparent upon reading the following specification and referring to the accompanying drawings in which similar characters of reference represent corresponding parts in each of the several views.

In the drawings:

FIG. 3 is a perspective view showing the commencement of the tearing away of the shipping container to expose the packages therein.

FIG. 4 is an exploded perspective view showing the upper end of the sleeve cut away and showing the completed organizer.

FIG. 5 is an exploded front elevation showing removal of some of the packages from the organizer of FIG. 4.

FIG. 6 is a perspective view similar to FIG. 2 of a modification.

FIG. 7 is a perspective view showing a plurality of organizers in accordance with this invention displayed in a frozen food refrigerator at the point of sale.

Figure 1:
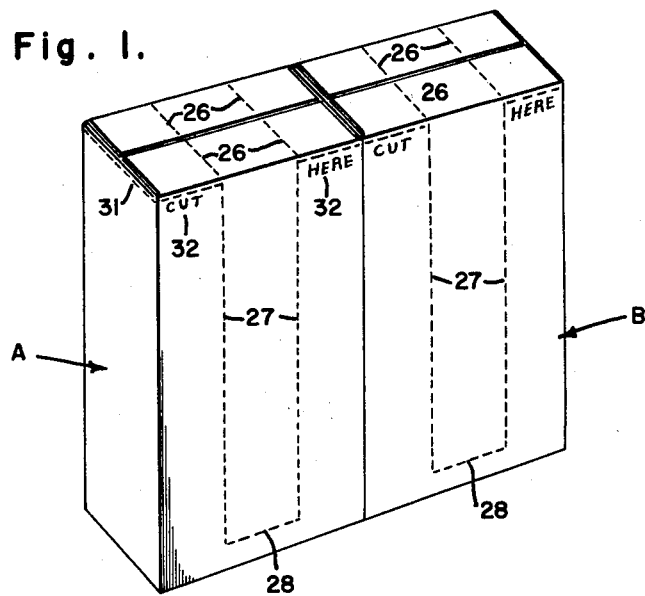
FIG. 1 is a perspective view of a pair of sleeve-like cartons glued or otherwise held together in side-by-side relationship.
Figure 2:
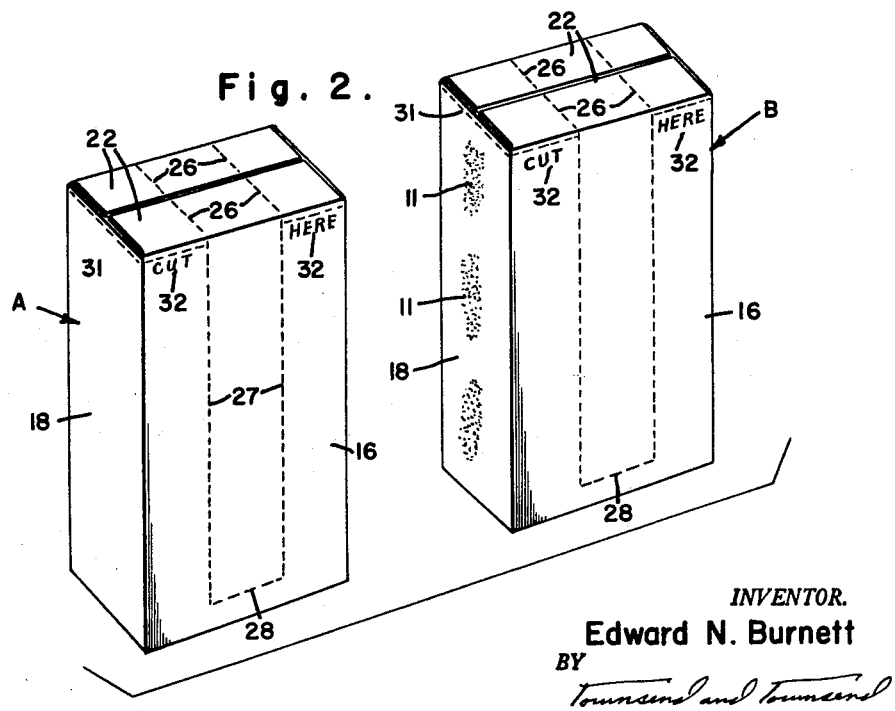
FIG. 2 is a perspective view showing the two cartons of FIG. 1 separated.

In accordance with the present invention, as shown in FIG. 1, there is preferably provided a pair of sleeve-like shipping containers A, B glued or otherwise assembled together in side-by-side relationship as by glue spots 11. It will be understood that single containers may be used in accordance with this invention or, alternatively, that more than two containers may be so adhered. Each container is preferably end-loaded with a plurality of packages 12 in side-by-side relationship. At the point of sale the two containers A, B are separated from each other by parting the adhesive (see FIG. 2). Since each of the halves is substantially identical, only one is hereinafter described. In the preferred form of the invention herein illustrated, each carton is formed of corrugated paper, cardboard or the like and is rectangular in cross section, having an internal dimension sufficient to hold a frozen food package 12 flat or several thereof side by side depending upon the type of merchandise being packed. In a preferred form of the invention the over-all length of the sleeve is substantially equal to the height of the load line of a conventional open-top, retail-store, frozen food refrigerator.

The sleeve preferably has a front 16 and back 17 and two end panels 18, a joining strip 19 along one side panel being preferably overlapped by the back panel 17 and suitably adhered thereto by glue, stitching, stapling or application of tape, or other means well understood in the container art.

The inner top end flaps 21 comprise extensions of the side panels 18 and the outer end flaps 22 comprise extensions of the front and back panels 16, 17 and preferably meet at the center of the end in conventional fashion. The dimension and positions of the bottom end flaps (not shown) are substantially the same as those illustrated and described for the top end flaps. Preferably a rectangular separator 23 dimensioned to fit inside the sleeve is interposed between the topmost package 12 and the inner flaps 21.

In accordance with the present invention, a pair of perforations 26 are formed on the top outer end flaps 22 extending from the central parting edge across the top, each perforation being spaced about one-third the width of the container. Additional perforations 27 extend down the front and rear panels 16, 17 to termini adjacent but spaced from the lower edge and constitute downward extensions of lines 26. Preferably transverse perforations 28 join the lower termini of perforations 27. Preferably printed or otherwise displayed guide lines 31 and legends 32 are located adjacent the top of the carton around all four faces of the front, rear and sides. After the tear-away strips 29 between perforations 26, 27 have been removed as shown in FIGS. 3 and 4, the retailer cuts the top of the carton along the dotted guide line 31 as directed by the "Cut Here" legends 32, resulting in the organizer shown in FIG. 4.

Inside the carton is a plurality of packages 12 such as conventional rectangular frozen food packages. It will be understood that other containers, such as layers of smaller frozen food packages, may be transported or other types of containers such as cans or plastic containers may fill the sleeves. When the strips 29 are torn away but the packages are still contained therein, all of the packages 12 are exposed and may be conveniently marked with a price symbol if desired.

In the form of the invention shown in FIG. 6, the container is similar to that shown in the previous modification, except that the perforated lines 26a, 27a are diagonally disposed. Thus the top perforations 26a angle outwardly toward the outer edge and then, perforations 27a on the front and rear panels angle inwardly to the bottom termini. Other parts of the container are similar to the modification of FIGS. 1–6 and bear the same reference numerals followed by the subscript *a*.

In use, the tear strips 29 are removed and the top cut on line 32 as previously described. The prior organizer is removed from the refrigerator 41 and replaced by that shown in FIG. 4, the packages 12 remaining in the removed organizer being placed on top of the new one (see FIG. 7). The customer removes the packages 12 one at a time from the open top of the organizer and the remaining packages are held in organized fashion.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A container for a plurality of smaller containers and an organizer for point-of-sale display of said smaller containers within said container comprising a rectangular sleeve having front, back and a pair of side panels and means for securing meeting edges of two said panels together to form a longitudinal joint therefor, a top inner end flaps at the top end of said sleeve hingedly connected to said side panels, top outer end flaps at the top end of said sleeve hingedly connected to said front and back panels and overlying said top inner end flaps, the inner edges of said top outer end flaps meeting along a transverse central parting line across said top end, means closing off the bottom end of said sleeve, each said top outer flap formed with spaced first score lines extending from said parting line to the corner where said outer flap joins the contiguous sleeve panel, each said front and back panel formed with spaced second score lines comprising continuations of said first score lines, said second score lines extending down toward said bottom of said sleeve but terminating a distance from the bottom of said sleeve, and third score lines interconnecting the bottom edges of said second score lines, said third score lines parallel to but spaced from said bottom; whereby, upon pulling each said top outer flap between said first score lines at said parting line a tear strip is formed which may be severed from said container across the top and down to said third score line, said front, back and side panels also being severable along the extreme top edges thereof to remove said top inner and outer flaps, the remainder of said container thereupon comprising an organizer having an open top and an opening equal to the width of said tear strips down the front and back panels to the level of said third score line to provide access to the smaller containers within said container.

2. A device according to claim 1 in which said first score lines diverge outwardly and said second score lines converge.

3. A device according to claim 1 which further comprises a plurality of smaller cartons inside said sleeve stacked on top of each other, the thickness of each said carton being substantially less than the distance of the lower ends of said second score lines from said second end.

References Cited in the file of this patent

UNITED STATES PATENTS

| | | |
|---|---|---|
| 1,712,249 | Byrne | May 7, 1929 |
| 2,115,673 | Stompe | Apr. 26, 1938 |
| 2,362,862 | Sidebotham | Nov. 14, 1944 |
| 2,864,548 | Zastrow | Dec. 16, 1958 |
| 2,944,124 | Arnold | July 5, 1960 |